US009302494B2

(12) United States Patent
Yamaguchi

(10) Patent No.: US 9,302,494 B2
(45) Date of Patent: Apr. 5, 2016

(54) ERASING APPARATUS AND PROGRAM EXTRACT A MARK ON A SHEET TO ERASES AN IMAGE BY PERFORMING DECOLORIZING PROCESS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yoichi Yamaguchi, Gotenba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/305,369

(22) Filed: Jun. 16, 2014

(65) Prior Publication Data

US 2014/0376008 A1 Dec. 25, 2014

(30) Foreign Application Priority Data

Jun. 20, 2013 (JP) ................................ 2013-129413

(51) Int. Cl.

| | |
|---|---|
| ***B41J 2/325*** | (2006.01) |
| ***B41C 1/045*** | (2006.01) |
| ***G06K 15/16*** | (2006.01) |
| ***B41J 2/32*** | (2006.01) |
| ***B41J 11/00*** | (2006.01) |

(52) U.S. Cl.

CPC *B41J 2/32* (2013.01); *B41J 11/008* (2013.01); *B41J 2202/37* (2013.01)

(58) Field of Classification Search

None

See application file for complete search history.

(56) References Cited

U.S. PATENT DOCUMENTS

| | | | | |
|---|---|---|---|---|
| 2011/0211006 | A1* | 9/2011 | Ochiai | 347/16 |
| 2012/0262750 | A1* | 10/2012 | Kinoshita et al. | 358/1.14 |
| 2012/0306983 | A1 | 12/2012 | Mizutani et al. | |
| 2012/0306985 | A1 | 12/2012 | Iguchi et al. | |
| 2013/0222459 | A1* | 8/2013 | Hisaoka et al. | 347/16 |

FOREIGN PATENT DOCUMENTS

| | | |
|---|---|---|
| JP | 3247967 | 11/2001 |
| JP | 3279798 | 2/2002 |

(Continued)

OTHER PUBLICATIONS

Machine translation of JP Pub 2012-118526 to Nozawa et al.*

(Continued)

*Primary Examiner* — Benny Q Tieu
*Assistant Examiner* — Haris Sabah
(74) *Attorney, Agent, or Firm* — Amin, Turocy & Watson, LLP

(57) ABSTRACT

An erasing apparatus of an embodiment includes a reading unit, a printing unit, a transport unit, and a control unit. The reading unit reads an image formed on a sheet. The printing unit includes a plurality of nozzles that output colorants, and prints any one of a mark that is defined in advance or a code image of a machine-readable format on the sheet. The transport unit transports the sheet in order of the reading unit and the printing unit. The control unit detects an amount of deviation of the sheet generated on a transport path based on the image on the sheet which is read by the reading unit, selects which nozzle in the printing unit to output the colorant based on the amount of deviation, and controls the printing unit so as to perform printing from the selected nozzle.

7 Claims, 5 Drawing Sheets

(56) References Cited

FOREIGN PATENT DOCUMENTS

| | | |
|---|---|---|
| JP | 2008-023963 | 2/2008 |
| JP | 2012-118526 | 6/2012 |

OTHER PUBLICATIONS

Office Action of Notification of Reason(s) for Refusal for Japanese Patent Application No. 2013-129413 Dated Dec. 16, 2014, 3 pages.

* cited by examiner

ERASING APPARATUS AND PROGRAM EXTRACT A MARK ON A SHEET TO ERASES AN IMAGE BY PERFORMING DECOLORIZING PROCESS

CROSS-REFERENCE TO RELATED APPLICATION

This application is based upon and claims the benefit of priority from Japanese Patent Application No. 2013-129413, filed Jun. 20, 2013, the entire contents of which are incorporated herein by reference.

FIELD

Embodiments described herein relate generally to a decolorizing apparatus (erasing apparatus) which erases an image by performing a decolorizing process on a sheet having the image formed with a decolorable colorant.

BACKGROUND

In the related art, there is a decolorizing apparatus which erases an image by heating a sheet having the image formed with a decolorable colorant at a decolorable temperature. It is possible to erase the image formed on the sheet using the decolorizing apparatus, thereby allowing the sheet to be reused.

If the same sheet is used many times, some images are not completely erased and remain, and thus visibility is deteriorated. Accordingly, some decolorizing apparatuses print a mark indicating the number of times of erasing on a margin of a sheet each time an image is erased, and if there are marks of a predetermined number or more, the apparatuses treat the sheet as a non-reusable sheet and transport the sheet to a predetermined tray.

DETAILED DESCRIPTION

Figure 1:
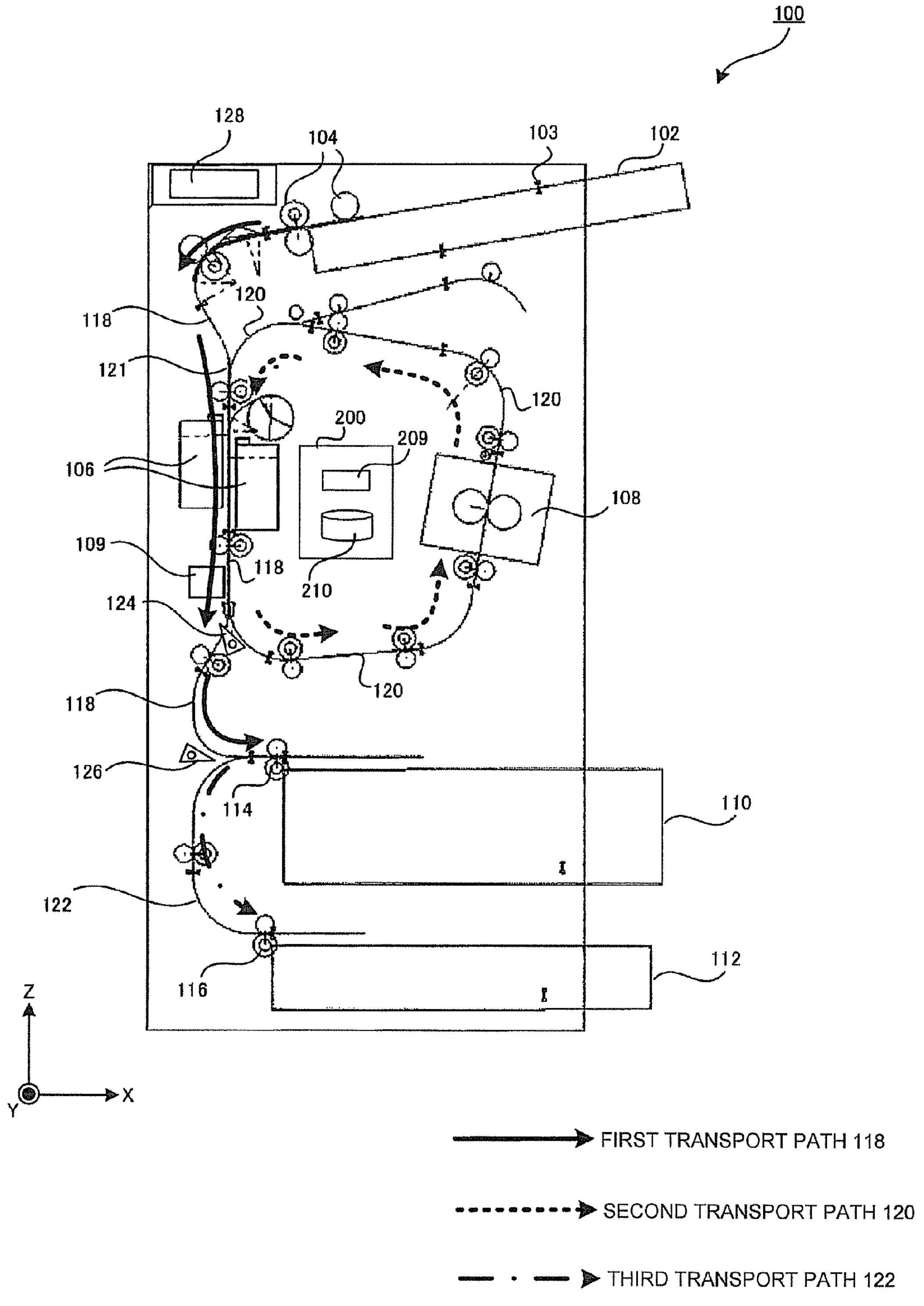
FIG. 1 is a diagram illustrating a hardware configuration example of a decolorizing apparatus of an embodiment.

A mark is printed outside of a defined position or is printed on a transport path outside of the sheet due to deviation of a sheet transport. This causes a false detection of the mark or a sheet being subsequently transported to be contaminated.

Embodiments were made to solve problems described above, and an object is to provide a technology of printing a mark in a defined position.

An erasing apparatus of an embodiment includes a reading unit, a printing unit, a transport unit, and a control unit. The reading unit reads an image formed on a sheet. The printing unit includes a plurality of nozzles that output colorants, and prints any one of a mark that is defined in advance or a code image of a machine-readable format on the sheet. The transport unit transports the sheet in order of the reading unit and the printing unit. The control unit detects an amount of deviation of the sheet generated on a transport path based on the image on the sheet which is read by the reading unit, selects which nozzle in the printing unit to output the colorant based on the amount of deviation, and controls the printing unit so as to perform printing from the selected nozzle.

The decolorizing apparatus of an embodiment determines how far a sheet being transported is deviated from a reference based on the image read by the reading unit. The decolorizing apparatus of the embodiment shifts positions of nozzles that print the mark depending on the amount of deviation. Further, the amount of deviation is assumed as an amount of difference between a predetermined reference position and an actual position when transporting the sheet in the present embodiment.

The decolorizing apparatus of the embodiment prints a rectangular mark indicating the number of times of erasing on a marginal portion of the sheet each time a decolorizing process is performed. The mark is printed with a common ink or toner which is not the decolorable colorant. If there is already a mark, the decolorizing apparatus of the embodiment prints a new mark in a position close to an existing mark, which is defined in advance in order for the new mark not to overlap the existing mark.

The decolorizing apparatus of the embodiment determines whether there are marks of a predefined number (for example, 5) on the sheet. If there are marks of the predefined number or more, even if the image is subjected to the decolorizing process, there is a possibility that the image remains. Thus, the decolorizing apparatus of the embodiment treats the sheet as a non-reusable sheet and transports the sheet to a tray for a non-reusable sheet.

The decolorizing apparatus of the embodiment measures the amount of deviation in a printing position by detecting a sheet edge portion when printing the mark, and prints the mark in a position determined from the sheet edge portion. The decolorizing apparatus of the embodiment adjusts positions of output nozzles of the printing unit that print the mark, according to the measured amount of deviation. Since the printing position of the mark is corrected by detecting the deviation of the sheet, irrespective of the presence or absence of the transport deviation, it is possible to align the printing position of the mark in a defined position. Thus, the erroneous printing on the transport path is prevented and contamination of the subsequent sheet is also prevented. Further, since the position of the mark on the sheet can be aligned in the defined position, the reading and detection of the mark becomes easy and the detection accuracy is improved.

If a mark is already printed, the decolorizing apparatus of the embodiment can print a new mark while adjusting the position of the colorant output nozzle based on the position of the existing mark.

Hereinafter, respective embodiments will be described with reference to drawings. Further, a sheet is described as a paper medium in the following description, but an aspect is not limited.

FIG. 1 is a schematic diagram describing a configuration of a decolorizing apparatus. A decolorizing apparatus 100 (erasing apparatus) performs a "decolorizing process (erasing process)" of decolorizing an image formed with a decolorable colorant, with respect to a sheet having the image formed with the "decolorable colorant (erasable colorant)" such as a decolorable toner or a decolorable ink. The decolorable colorant includes a color forming compound, a developing agent, and a decolorizing agent. The color forming compound includes, for example, leuco dyes. The developing agent includes, for example, phenols. The decolorizing agent includes materials that are compatible with the color forming compound when being heated, and have no affinity with the developing agent. The decolorable colorant represents a color by an interaction between the color forming compound and the developing agent, and erases the color by the interaction between the color forming compound and the developing agent being cut off when being heated at a decolorable temperature or higher.

The decolorizing apparatus 100 includes a paper feed tray 102, a paper feed member 104, a reading unit 106, a decolorizing unit 108, a mark printing unit 109, a first tray 110, a second tray 112, discharge members 114 and 116, a first transport path 118, a second transport path 120, a third transport path 122, a first branch member 124, a second branch member 126, a display operation unit 128 and a control unit 200. In FIG. 1, respective transport paths and the transport directions thereof are indicated by arrows; the first transport path 118 is indicated by solid line arrows, the second transport path 120 is indicated by dashed line arrows, and the third transport path 122 is indicated by dotted and dashed line arrows.

The paper feed tray 102 places sheets for reuse. Although it is assumed that sheets of an A4 size are placed on the paper feed tray 102, sheets of other sizes (for example, an A3 size and a B4 size) may be placed. The sheets placed on the paper feed tray 102 are, for example, sheets having images formed with a colorant to be decolorized when being heated at a predetermined temperature or higher. The paper feed member 104 includes a pick-up roller, a sheet supply roller, a separation roller which is placed opposite to the sheet supply roller, and the like. The paper feed member 104 supplies one sheet on the paper feed tray 102 to the first transport path 118 inside the decolorizing apparatus 100 at a time. Further, the paper feed tray 102 includes a detection sensor 103 that detects the presence or absence of the sheet on the paper feed tray 102 and the size of a sheet.

Along the first transport path 118, the sheet supplied from the paper feed tray 102 is transported to the reading unit 106, or the mark printing unit 109 and the discharge unit of the first tray 110.

The reading unit 106 is located in a downstream of the sheet transport direction relative to the paper feed tray 102 and disposed along the first transport path 118. The reading unit 106 includes, for example, a reading unit such as a Charge Coupled Device (CCD) scanner or a CMOS sensor. In the present embodiment, the reading unit 106 reads respective images on a first surface and a second surface of the sheet being transported. In other words, the reading unit 106 is configured with two reading units which are disposed along the first transport path 118 and across the transport path so as to enable a double-sided reading of the images on the sheet being transported. The image read by the reading unit 106 is stored in a storage unit 210 which will be described later. For example, the image on the sheet read by the reading unit 106 is digitized and stored in the storage unit 210 before being subjected to the decolorizing process, and thus it is possible to acquire image data when data of the decolorized image is required later. Further, the control unit 200 determines whether the sheet is a decolorable sheet or a reusable sheet, based on the image read by the reading unit 106.

The mark printing unit 109 is present in the downstream of the reading unit 106. The mark printing unit 109 prints a rectangular mark on a marginal portion of the sheet, using a common colorant that is not the decolorable colorant. The mark printing unit 109 is fixed to a main body of the decolorizing apparatus 100. The mark printing unit 109 includes a plurality of output nozzles and determines which one of the plurality of output nozzles performs printing, and thus adjusts a mark printing position on the sheet so as to perform printing in a defined position.

When the reading unit 106 does not detect even one mark, the mark printing unit 109 prints a mark in an initial position defined in advance. Further, when the reading unit 106 detects an existing mark, the mark printing unit 109 prints a new mark in a position aligned in the transport direction of the first transport path 118 so as not to overlap the existing mark.

In the present embodiment, the mark printing unit 109 is disposed in only one surface side of the sheet. For example, when it is detected that there is no mark on the one surface and there is one existing mark on the opposite surface, the mark printing unit 109 prints a new mark in a second defined position without printing a mark in the initial position of the one surface. For example, when there is no existing mark on the opposite surface and there is one existing mark on the one surface but the sheet is present in an upside-down position, the mark printing unit 109 prints a new mark in a second position without printing a mark in the initial position. Even when there are a plurality of existing marks, the mark printing unit 109 prints a mark in a defined position corresponding to the number of marks in the same manner as the above. Even when existing marks are respectively present in an upside-down position or a front-rear reversed position, the mark printing unit 109 prints a mark in a defined position corresponding to the number of detected existing marks.

It is assumed that the mark printing unit 109 is printed using a common colorant in the present embodiment, but a decolorable colorant may be used depending on an aspect. In this case, it is preferable that the mark be printed with a colorant having different decolorable temperature. The shape of the mark is not limited to a rectangle and any shape of mark may be used. Here, the mark includes characters without being limited to figures. Further, the color of the mark is set to red in order to improve identification in the present embodiment, but is not limited thereto.

There is a first branch member 124 as a switching unit in the downstream of the mark printing unit 109. The first branch member 124 switches the transport direction of the sheet being transported. The first branch member 124 transports the sheet being transported in the first transport path 118 to the second transport path 120 or the first tray 110. The second transport path 120 is a transport path that is caused to branch from the first transport path 118 by the first branch member 124 disposed in the downstream of the mark printing unit 109, and the sheet is transported to the decolorizing unit 108 along the second transport path 120. Further, the second transport path 120 joins the first transport path 118 at a joining point 121 in the upper stream of the sheet transport direction than the reading unit 106. Therefore, along the second transport path 120, the sheet transported from the reading unit 106 and the mark printing unit 109 can be again transported to the reading unit 106 through the decolorizing unit 108. In other words, the decolorizing apparatus 100 controls the first branch member 124 so as to able to transport the sheet supplied from the paper feed member 104 to the reading unit 106, the mark printing unit 109, the decolorizing unit 108, and the reading unit 106 in order.

The first transport path 118 includes a second branch member 126 in the downstream of the first branch member 124. The second branch member 126 guides the sheet transported from the first branch member 124 to a first tray 110 or a third transport path 122. Along the third transport path 122, the sheet is transported to the second tray 112.

The decolorizing unit 108 erases an image formed on the sheet being transported. For example, the decolorizing unit 108 decolorizes the image formed on the sheet with the decolorable material, by heating the sheet to a predetermined decolorable temperature while being in contact with the sheet being transported.

The decolorizing unit 108 includes two heat sources respectively for decolorizing a first surface of the sheet and a second surface of the sheet. Respective heat sources include a heat roller that generates heat when power is supplied, and are disposed so as to sandwich the sheet transport direction of the second transport path 120. One heat source heats the sheet while being in contact with the sheet from one surface side of the sheet, and the other heat source heats the sheet while being in contact with the sheet from the other surface side of the sheet. Thus, both surfaces of the sheet are decolorized by a process at the same time.

The display operation unit 128 disposed in an upper part of the main body of the decolorizing apparatus 100 includes a display unit of a panel type, a touch panel stacked on the display unit, and an operation unit including various operation keys. The operation key includes, for example, numeric keys. The user instructs functional operations of the decolorizing apparatus 100 such as a start of decolorizing and a reading of an image of a sheet to be decolorized, through the display operation unit 128. The display operation unit 128 displays setting information, an operation status, log information, or a message for the user of the decolorizing apparatus 100.

The discharge members 114 and 116 respectively discharge the sheet to the first tray 110 and the second tray 112 which are disposed vertically on the lower part of the main body. The sheets on which the images are decolorized and which are reusable are placed on the first tray 110. The sheets which are determined as being non-reusable are placed on the second tray 112. Hereinafter, the first tray 110 is referred to as a reuse tray, and the second tray 112 is referred to as a reject tray. In addition, it is also possible to replace the sheet to be accommodated in the reuse tray 110 and the reject tray 112. The setting as to which sheets to be placed on respective trays, in other words, the setting of the transport destination of sheets may be performed, for example, from the display operation unit 128. Depending on the setting, the second branch member 126 switches the transport path and guides the transported sheet to the first tray 110 or the third transport path 122.

The decolorizing apparatus 100 includes a control unit 200 that collectively controls respective hardware units in the decolorizing apparatus 100. Respective units of the decolorizing apparatus 100 are connected to the control unit 200 and receive and transmit instruction signals and the like.

The control unit 200 includes a processor 209 and a storage unit 210. The processor 209 is an arithmetic processing device such as, for example, a Central Processing Unit (CPU) or a Micro Processing Unit (MPU), and gives instructions to respective hardware units by operating and executing a program stored in advance in the storage unit 210. The storage unit 210 includes, for example, semiconductor memories: a Read Only Memory (ROM) having various control programs stored therein and a Random Access Memory (RAM) providing a temporary work area to the processor 209. Further, the storage unit 210 includes a Hard Disk Drive (HDD) that stores user data, setting data that the decolorizing apparatus 100 uses, and the like in a non-volatile manner. The storage unit 210 stores, for example, a printing ratio of a sheet which is a threshold of re-usability, a density threshold for determining whether an image is decolorized, and the like. In addition to this, the storage unit 210 stores the number of times of decolorizing that is detected based on the image read by the reading unit 106. Further, the storage unit 210 may temporarily or permanently store the image read by the reading unit 106.

Here, the overall operation of the decolorizing apparatus 100 will be described. The sheets to be decolorized, which are placed on the paper feed tray 102, are transported along the first transport path 118 to the reading unit 106, and both surfaces of the sheet are read. The read image data is temporarily or permanently stored in the storage unit 210 of the control unit 200. The sheet is transported to the mark printing unit 109 after that, but the mark is not printed at this stage in the present embodiment. The sheet passing through the mark printing unit 109 is transported to the second transport path 120 by the switching operation of the first branch member 124, and the sheet is transported to the decolorizing unit 108 along the second transport path 120. The sheet after being subjected to the decolorizing process is transported again to the first transport path 118 and a second reading is performed in the reading unit 106.

After the reading unit 106 performs the second reading, the mark printing unit 109 prints a mark on the margin of the sheet in response to the instruction from the control unit 200. At this time, the mark printing unit 109 receives identification information of the output nozzle, and a signal or information indicating a position of the mark from the control unit 200 and prints a mark in the indicated position.

In contrast, the control unit 200 analyzes first read image data and detects the presence or absence of the existing mark while performing the sheet decolorizing process and the like. When there is the existing mark, the control unit 200 acquires the number of the existing marks. The control unit 200 outputs identification information of the nozzle and the positional information to the mark printing unit 109 so as to print the mark in the position corresponding to the number of marks, and determines whether the number of marks is equal to or greater than a predetermined value. When the number of marks is less than the predetermined value, that is, the number of reuses does not reach the predetermined number of times, the sheet is reusable, and thus the control unit 200 operates the second branch member 126 to transport the sheet to the reuse tray 110. When the number of marks is equal to or greater than the predetermined value, if the sheet is used more, there is a possibility that a remaining image is generated, and thus the control unit 200 operates the second branch member 126 and the third transport path 122 to transport the sheet to the reject tray 112.

Further, the control unit 200 analyzes second read image data (image data after being subjected to the decolorizing process) and detects the presence or absence of the remaining image. The control unit 200 analyzes the state of the sheet (the presence or absence of staple traces, the presence or absence of punched holes, bent sheets, and the like), using the first read image data or the second read image data. The control unit 200 determines whether the sheet is reusable, according to the status analysis of the sheet and the determination result of the remaining image, in addition to the number of reuses. The control unit 200 performs control so as to transport the sheet to any one of the reuse tray 110 and the reject tray 112 according to the determination result.

The sheet is deviated due to the state of the sheet or wear of the transport path by use over time while being transported. In this case, the mark printing unit 109 is required to correct the deviation and to print a mark. Hereinafter, a detailed correction operation of the mark printing unit 109 will be described. The following description will be made by taking the front side of paper in the Y-axis direction of FIG. 1 as the front side of the decolorizing apparatus and the rear side of paper in the Y-axis direction as the rear side of the decolorizing apparatus.

Figure 2:
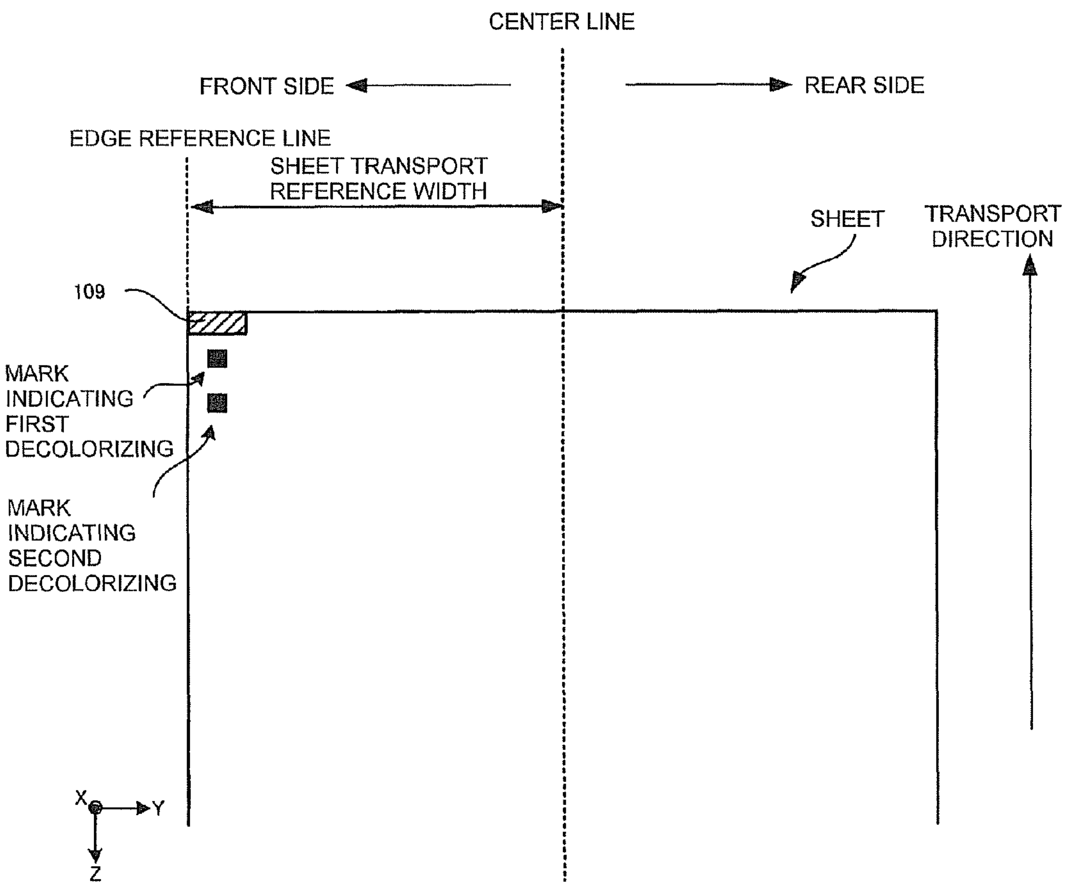
FIG. 2 is a diagram illustrating an example of a positional relationship between a sheet and a mark printing unit when the sheet is transported to a defined position.
Figure 3:
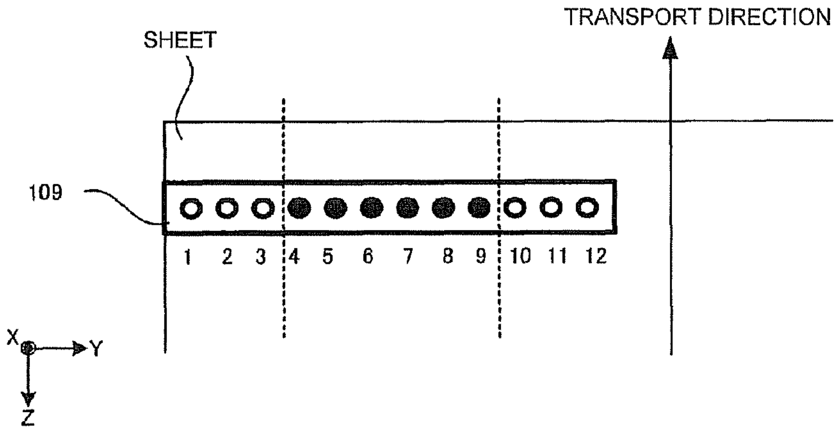
FIG. 3 is a diagram illustrating a position of a colorant output nozzle when the sheet is transported in a state of FIG. 2.

FIG. 2 illustrates a positional relationship between the mark printing unit 109 and a sheet when transport deviation does not occur, and FIG. 3 illustrates a position of the colorant output nozzles of the mark printing unit 109 in the case of FIG. 2. In the present embodiment, a line which is a reference of the sheet edge portion (edge reference line) is provided at a position of a half the width of A4 size (sheet transport reference width in FIG. 2, 210 mm/2=105 mm) in a front side direction of a Y-axis, from a center line on design or mounting of the first transport path 118. The mark printing unit 109 is fixed to the apparatus housing in such a manner that a side wall on the front side is located in the edge reference line. Further, twelve output nozzles of the mark printing unit 109 are aligned and arranged in the Y-axis direction (a direction perpendicular to the transport direction) as illustrated in FIG. 3, and six consecutive nozzles out of the twelve nozzles are used (indicated by black circles in FIG. 3). The output nozzles are provided in a portion out of a printing range in the Y-axis direction, that is, more nozzles than the number of nozzles used in the printing are provided. The interval between the output nozzles is set to 0.5 mm in the present example.

As illustrated in the example of FIG. 2, when the front-side edge portion of a sheet being transported is located immediately above the edge reference line, or is located within an acceptable range, as illustrated in FIG. 3, the output nozzles 4 to 9 located in the center are used.

Figure 4:
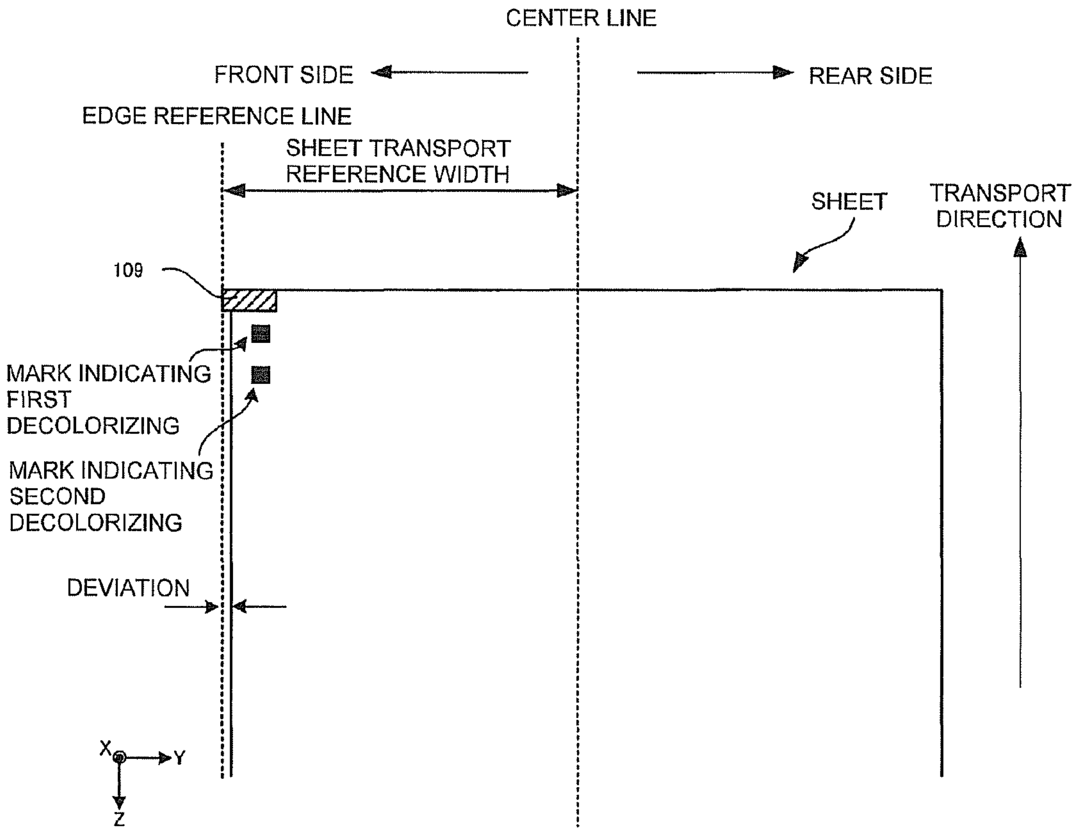
FIG. 4 is a diagram illustrating an example of a positional relationship between the sheet and the mark printing unit when the sheet is transported while being deviated to a rear side of the apparatus.
Figure 5:
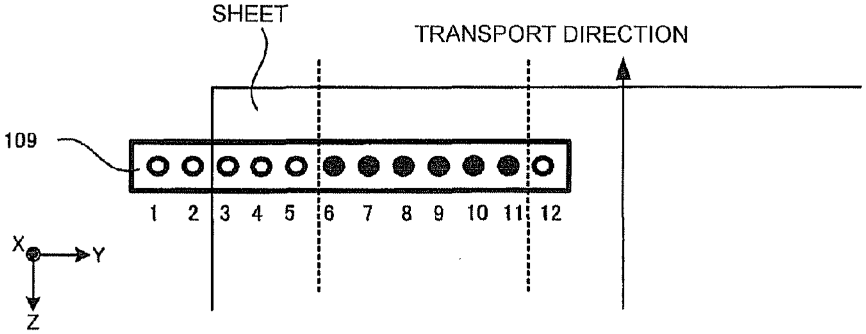
FIG. 5 is a diagram illustrating a position of a colorant output nozzle when the sheet is transported in a state of FIG. 4.

Further, when the sheet is transported while being deviated to the rear side as illustrated in FIG. 4, the position of the nozzle is located in the front side relative to the sheet being transported. In this state, if the output nozzles 4 to 9 located in the center of the output nozzle are used, the mark printing is close to the front side, and deviated from the defined position. Accordingly, in the present embodiment, the positions of the output nozzles are shifted to the rear side to which the sheet is close, by the amount of deviation. FIG. 5 illustrates a state of the output nozzles when the transport deviation of about 1.0 mm occurs on the rear side. Since the interval between the nozzles is set to 0.5 mm, when the sheet is deviated by 1.0 mm, the nozzles 6 to 11 are used by shifting the positions of the nozzles by two from the center position to the rear side as illustrated in FIG. 5.

Figure 6:
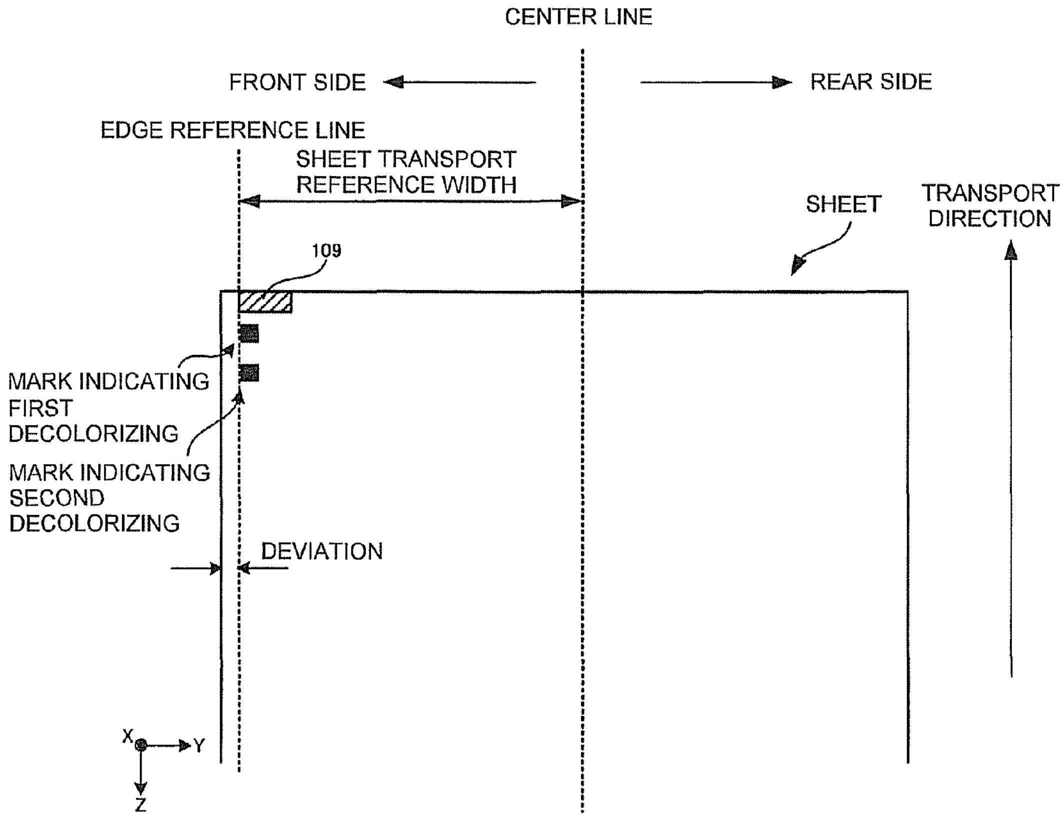
FIG. 6 is a diagram illustrating an example of a positional relationship between a sheet and a mark printing unit when the sheet is transported while being deviated to a front side of the apparatus.
Figure 7:
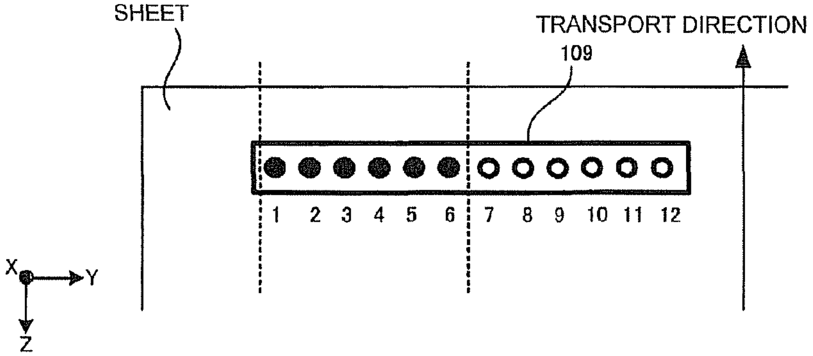
FIG. 7 is a diagram illustrating a position of a colorant output nozzle when the sheet is transported in a state of FIG. 6.

FIGS. 6 and 7 illustrate a positional relationship and a state of the output nozzle when the sheet being transported is deviated by about 1.5 mm to the front side. Since the sheet is deviated by about 1.5 mm to the front side, the nozzles 1 to 6 are used by shifting the positions of the output nozzles by three from the center position to the front side in this case. In this manner, in the present embodiment, whenever the sheet being transported is deviated to the rear side or the front side by one interval between the nozzles, the positions of the nozzles are shifted to the rear side or the front side by the amount corresponding to the length of one nozzle so as to output a colorant.

Further, as illustrated in FIGS. 2, 4, and 6, when the sheet is already reused and there is the existing mark, the amount of deviation may be calculated based on the printing position of the existing mark. When there is only one existing mark, the position of the side of the front-side edge portion or the rear-side edge portion of the mark is obtained. The control unit 200 calculates how far the obtained position of the side is deviated from the reference which is defined in advance and calculates the amount of deviation of the sheet being transported. When there are a plurality of existing marks, the position of the side of the front-side edge portion or the rear-side edge portion for any one mark may be compared with the reference. Further, with respect to a case where there are a plurality of existing marks, respective edge portions on one side of a plurality of existing marks are detected, a line which is an index or a representative for the existing marks (for example, an average line) is calculated, and thus the index line may be compared with the reference.

In this manner, when there is the existing mark, the reference is compared with the position of the existing mark rather than the position of edge of the sheet, such that it is possible to set the detection target region only to the mark printed portion rather than the entire surface of the sheet and to reduce a calculation time. Further, the amount of deviation is detected using the sheet edge portion, and thus it is possible to detect mainly the transport deviation due to an installation error in mounting the mark printing unit and degradation in use over time. Furthermore, the amount of deviation is detected using the existing mark, and thus it is possible to detect mainly the transport deviation due to the state of the sheet.

Figure 8:
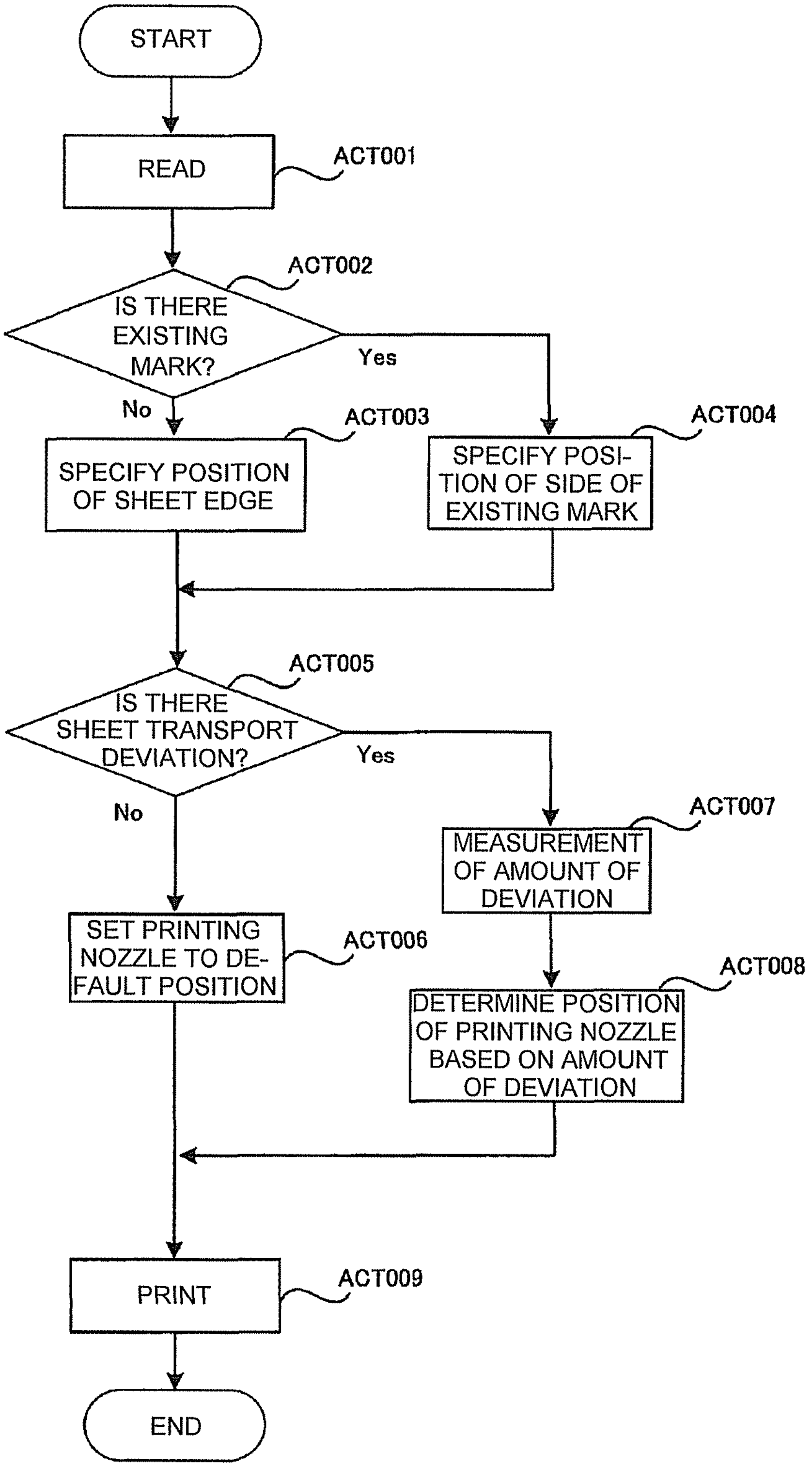
FIG. 8 is a flowchart illustrating an operation example when printing a mark.

FIG. 8 is a flowchart illustrating an operation example when the decolorizing apparatus 100 prints the mark. The operation of the control unit 200 in the flowchart of FIG. 8 is implemented by the processor 209 operating and executing a program which is introduced in advance to the storage unit 210. Further, the process illustrated in the flowchart of FIG. 8 is performed once for each sheet. In the flowchart of FIG. 8, ACT001 is a first reading operation immediately after a sheet is fed from the paper feed tray 102. Further, ACT002 to ACT006 or ACT008 are performed while the sheet is transported in the second transport path 120 or the decolorizing process or the like is performed in the decolorizing unit 108.

First, the reading unit 106 reads the sheet (ACT001). The read image data is stored in the storage unit 210. The control unit 200 determines whether there is an existing mark in the image data (ACT002). The control unit 200 determines whether there is a pattern corresponding to a mark within a defined range of a marginal portion, using a pattern matching technology or an edge detection technology in the related art. When there is the existing mark (Yes in ACT002), the control unit 200 extracts the side of the rear side or the front side of the existing mark and specifies the position of the extracted side (ACT004). The control unit 200 extracts the side of the existing mark, using, for example, the edge detection technology, and stores the extracted position in the storage unit 210. Further, the position in this case is assumed as a pixel value represented by X and Y values in an image plane. In contrast, when there is no existing mark (No in ACT002), the control unit 200 extracts the sheet edge and specifies the position of the extracted sheet edge (ACT003). Similarly to ACT004, in ACT003, the control unit 200 extracts the edge portion, using, for example, the edge detection technology, and stores the pixel value of the sheet edge portion in the storage unit 210.

The control unit 200 detects the presence or absence of deviation due to the sheet transport (ACT005). The control unit 200 compares the position (pixel value) specified in ACT003 or ACT004 with the position (pixel value) which is the reference defined in advance. Two reference values: a reference value for a mark position and a reference value for a sheet edge portion are introduced in advance in the storage unit 210. In ACT005, the control unit 200 acquires the corresponding reference value from the storage unit 210 and performs a comparison process.

When there is no deviation, in other words, the pixel value acquired in ACT003 or ACT004 matches the reference pixel value (No in ACT005), the control unit 200 sets the position of the output nozzle to a center default position (state illustrated in FIG. 3) (ACT006), and gives a printing instruction to the mark printing unit 109. Here, the control unit 200 outputs an identification number of the nozzle located in the center portion (in the present example, 4 to 9) to the mark printing unit 109 and gives a printing instruction. The mark printing unit 109 starts printing of a rectangular mark in the indicated colorant output nozzle (ACT009).

In contrast, there is deviation (Yes in ACT005), the amount of deviation is measured by calculating a difference between the pixel value acquired in ACT003 or ACT004 and the reference pixel value (ACT007). Here, the difference value may be calculated using only the pixel value of an X-component (a component of a direction perpendicular to the sheet transport direction) in the image plane, but a Y-component (a component of the sheet transport direction) in the image plane may be considered. The control unit 200 stores the pixel value of the difference in the storage unit 210.

The control unit 200 determines which nozzle a printing is to be performed from, based on the amount of deviation (ACT008). A table having a record obtained by associating the amount of deviation (here, pixel value) with the identification number of the nozzle is stored in advance in the storage unit 210. The control unit 200 determines the colorant output nozzle from the amount of deviation using the table. When the amount of deviation is within the defined range, the nozzle located in a default center portion is selected without shift. In a case of this embodiment, a range obtained by pixel-converting the value of about 0.5 (mm)/2, for example, ±0.2 mm or ±0.3 mm is assumed as a defined range. Further, the colorant output nozzle may be determined from the amount of deviation, using a calculation expression or a conditional expression which is defined in advance rather than a table.

The control unit 200 outputs the identification number of the selected nozzle and gives a printing instruction to the mark printing unit 109. Thus, the mark printing unit 109 starts printing in the designated nozzle (ACT009).

Although it is described that the process illustrated in the flowchart of FIG. 8 is performed once for each sheet, in a case of a job performing the decolorizing process on a plurality of sheets at a time, implementation may be performed in such a manner that the colorant output nozzle is determined by measuring the amount of deviation and the like for only the first sheet in the job and the mark printing is performed in the set nozzle for subsequent sheets in the same job.

Further, although the amount of deviation is calculated using the image which is read first in the flowchart of FIG. 8 in view of a transport speed and operation processing time, implementation may be performed in such a manner that the amount of deviation is calculated using the image which is read second.

The values and the like described in the above embodiment are only an example, but forms are not limited thereto.

Although it is described in the embodiments that the rectangular mark indicating the number of reuses is printed, the shape is not limited thereto. For example, an image of a management code of a machine-readable format such as a bar code or a QR code may be printed.

The embodiment is an example in which extra nozzles are incorporated into the inside of the printing unit and a nozzle to output a colorant is selected from a plurality of nozzles. Further, in the embodiment described above, the position deviation is adjusted by shifting the position of the colorant output nozzle in the same direction as the direction to which the sheet is close. As the embodiment described above, the printing unit itself is fixed and only the output nozzle is switched and shifted, and thus it is possible to facilitate mounting without making mounting complex and to suppress energy consumption. Further, in addition to the mounting example of the present embodiment, a mounting example is available in which the printing unit itself is movable, thereby allowing the position deviation to be corrected and adjusted by slide-moving the entire printing unit.

The functions described in the embodiments may be provided as a program. The program is executed in an apparatus including a storage apparatus and an operation apparatus. The program is a program by which the printing unit including a plurality of nozzles that output colorants performs a process of printing any one of a mark that is defined in advance or a code image of a machine-readable format on the sheet. The program causes the apparatus to execute a process of acquiring an image obtained by capturing a sheet and storing the acquired image in the storage unit. Further, the program causes the apparatus to execute a process of detecting the amount of deviation of the sheet occurred due to sheet transport based on the acquired image and a process of selecting which nozzle of the printing unit outputs the colorant based on the amount of deviation. Further, the program causes the apparatus to execute a process of controlling the printing unit so as to perform printing from the selected nozzle.

A case in which functions of implementing the present embodiment are recorded in advance in the inside of the apparatus is described in the present embodiment, but without being limited thereto, the same functions may be downloaded in the apparatus from the network, and a recording medium storing the same functions may be installed in the apparatus. As long as the recording medium is a recording medium such as a CD-ROM which may store a program and which may be read by an apparatus, the form may be any form. Further, the functions obtained through installation or downloading in advance in this manner may be realized in cooperation with an operating system (OS) or the like inside the apparatus.

As described above, in the present embodiment, it is possible to perform printing while suppressing the influence of deviation due to transport. This improves the detection accuracy with respect to the printed image.

In addition, in the description of the embodiments describe above, it is described that the "decolorizing process" is decolorizing of an image, but may include the meaning of erasing of an image. In other words, the decolorizing apparatus (erasing apparatus) described in the embodiment is not limited to a decolorizing apparatus of decolorizing an image by heat. For example, the decolorizing apparatus (erasing apparatus) may be an apparatus that decolorizes an image on a sheet by irradiating the sheet with light, or an apparatus that erases an image formed on a special sheet. Alternately, the decolorizing apparatus (erasing apparatus) may be an apparatus that removes (erases) an image on a sheet. The decolorizing apparatus may have a configuration that makes the image on the sheet invisible in order to make a sheet reusable.

In the above embodiment, an example applied to the decolorizing apparatus is described, but may be applied to a device that is integrally configured with an image forming apparatus and an erasing apparatus.

The present embodiment may be embodied in various other forms without departing from the spirit or essential characteristics thereof. Therefore, the foregoing embodiments are presented by way of example only in all respects, and are not to be interpreted restrictively. The scope of the present embodiment is defined by the appended claims, and is not restricted by the body of the specification. Furthermore, all changes, various modifications, alternatives and improvements belonging to the equivalent scope of the claims are within the scope of the present embodiment.

What is claimed is:

1. An erasing apparatus for erasing an image formed with a decolorable colorant on a sheet, comprising:

a reading unit for reading the image formed on the sheet;

a printing unit that includes a plurality of nozzles that output colorants for printing one of a mark that is defined in advance or a code image of a machine-readable format on the sheet;

a transport unit that transports the sheet in order of the reading unit and the printing unit along a transport path; and a control unit that extracts the mark or the code image from the image read by the reading unit, detects an amount of positional deviation of the sheet on the transport path based on a position of the extracted mark or code image on the sheet, selects which nozzle of the plurality of nozzles in the printing unit to output the colorant based on the amount of the positional deviation, and controls the printing unit so as to perform printing from the selected nozzle;

wherein in a case of a job for a plurality of sheets processed at a time, the control unit detecting the amount of the positional deviation for a first one sheet and performing the selection of the nozzle, controls the printing unit to print in the set nozzle for subsequent sheets in the same job.

2. The apparatus according to claim 1, wherein if the mark or the code image is not on the sheet read by the reading unit, the control unit extracts a sheet edge portion from the image on the sheet which is read by the reading unit, and detects the amount of the positional deviation based on a position of the sheet edge portion on the image.

3. The apparatus according to claim 2, wherein the plurality of nozzles in the printing unit are aligned in a direction perpendicular to a sheet transport direction of the transport path, and wherein the control unit selects nozzles which are consecutively arranged, from the plurality of nozzles, as colorant output nozzles, and when the sheet being transported is close to one side in the perpendicular direction, the control unit select the nozzles in positions shifted to the one side while maintaining continuity.

4. The apparatus according to claim 1, wherein the plurality of nozzles in the printing unit are aligned in a direction perpendicular to a sheet transport direction of the transport path of the transport unit, and wherein the control unit select nozzles which are consecutively arranged from the plurality of nozzles as colorant output nozzle, and when the sheet being transported is close to one side in the perpendicular direction, the control unit select the nozzles from the plurality of nozzles in positions shifted to the one side while maintaining continuity.

5. The apparatus according to claim 1, wherein the mark or the code image indicates the number of times of decoloring.

6. The apparatus according to claim 1, further comprising:

an erasing unit that erases the image formed on the sheet with the decolorable colorant.

7. An erasing apparatus for erasing an image formed with a decolorable colorant on a sheet, comprising:

a reading unit that reads the image formed on the sheet;

a printing unit that includes a plurality of nozzles that output colorants for printing on the sheet one of a mark that is defined in advance or a code image of a machine-readable format;

a transport unit that transports the sheet along a transport path to the reading unit and then to the printing unit; and a control unit that determines an amount of positional deviation of the sheet on the transport path, based on the image on the sheet which is read by the reading unit, selects which nozzle in the printing unit to output the colorant based on the amount of the positional deviation, and controls the printing unit so as to perform printing from the selected nozzle;

wherein in a case of a job for a plurality of sheets processed at a time, the control unit detecting the amount of the positional deviation for a first one sheet and performing the selection of the nozzle, controls the printing unit to print in the set nozzle for subsequent sheets in the same job.

* * * * *